(12) United States Patent
Smith

(10) Patent No.: US 9,020,358 B2
(45) Date of Patent: Apr. 28, 2015

(54) WAVELENGTH DIVISION MULTIPLEXING TRANSMISSION EQUIPMENT

(75) Inventor: David William Smith, Woodbridge (GB)

(73) Assignee: The Centre For Integrated Photonics Limited, Suffolk (GB)

(*) Notice: Subject to any disclaimer, the term of this patent is extended or adjusted under 35 U.S.C. 154(b) by 203 days.

(21) Appl. No.: 13/125,940

(22) PCT Filed: Oct. 26, 2009

(86) PCT No.: PCT/GB2009/051438
§ 371 (c)(1),
(2), (4) Date: Apr. 25, 2011

(87) PCT Pub. No.: WO2010/046714
PCT Pub. Date: Apr. 29, 2010

(65) Prior Publication Data
US 2011/0217039 A1   Sep. 8, 2011

(30) Foreign Application Priority Data
Oct. 25, 2008 (GB) .................................. 0819616.4

(51) Int. Cl.
*H04B 10/00* (2013.01)
*H04J 14/02* (2006.01)

(52) U.S. Cl.
CPC .................................... *H04J 14/02* (2013.01)

(58) Field of Classification Search
CPC ...................... H04J 2014/0253; H04J 14/0246;
H04J 14/025; H04J 14/02; H04J 14/0247;
H04J 14/0252; H04J 14/0282; H04J 2014/253;
H04J 14/0265; H04J 14/0249; H04J 14/0279;
H04J 14/0212; H04J 14/0213; H04J 14/0204;
H04B 10/506; H04B 10/61; H04B 10/50;
H04B 10/63; H04B 10/2503; H04Q 11/0005;
H04Q 11/0001; H04Q 2011/0032

USPC .......... 398/48, 49, 50, 66, 68, 71, 79, 82, 83,
398/56, 57, 60, 73, 167.5–171, 67, 70, 72,
398/182, 140, 167
See application file for complete search history.

(56) References Cited

U.S. PATENT DOCUMENTS

| 5,550,666 | A |   | 8/1996 | Zirngibl |   |
|---|---|---|---|---|---|
| 5,822,106 | A | * | 10/1998 | Knox et al. | ................... 359/245 |

(Continued)

FOREIGN PATENT DOCUMENTS

| EP | 1 511 194 A2 | 3/2005 |
|---|---|---|
| JP | 2002-318374 A | 10/2002 |

OTHER PUBLICATIONS

International Search Report dated Apr. 27, 2010 in International Application No. PCT/GB2009/051438.

(Continued)

*Primary Examiner* — Daniel Washburn
*Assistant Examiner* — Hibret Woldekidan
(74) *Attorney, Agent, or Firm* — Slater & Matsil, L.L.P.

(57) ABSTRACT

An optical transmission network comprises a multi-wavelength source (7) shared between multiple sets of client side equipment for manipulating electrical signals. A first wavelength selective routing element (5) is connected to the multi-wavelength source (7). Each set of client-side equipment (1) comprises an optical modulator (3) connected to the first wavelength selective routing element (5) and an optical receiver (2). A second wavelength selective routing element (6) is connected to the optical receiver (2) and is operative to direct incoming signals from one or more remote locations to the optical receiver (2). The network provides a WDM architecture solution for networks whereby the cost of implementing and running client side equipment (1) is reduced by not having the WDM source (7) within the client side equipment (1).

20 Claims, 3 Drawing Sheets

(56) References Cited

U.S. PATENT DOCUMENTS

| | | | |
|---|---|---|---|
| 6,512,612 B1* | 1/2003 | Fatehi et al. | 398/49 |
| 7,389,048 B2* | 6/2008 | Kani et al. | 398/72 |
| 2001/0015840 A1 | 8/2001 | Lyu | |
| 2002/0028039 A1* | 3/2002 | Lee et al. | 385/24 |
| 2002/0060825 A1* | 5/2002 | Weigold et al. | 359/152 |
| 2002/0191904 A1* | 12/2002 | Kani et al. | 385/24 |
| 2004/0042794 A1 | 3/2004 | Kim et al. | |
| 2004/0091199 A1* | 5/2004 | Goodfellow | 385/16 |
| 2005/0047784 A1 | 3/2005 | Jung et al. | |
| 2005/0286903 A1* | 12/2005 | Jennen et al. | 398/140 |
| 2006/0024066 A1 | 2/2006 | Fujiwara et al. | |
| 2006/0083515 A1* | 4/2006 | Hann et al. | 398/87 |
| 2006/0140631 A1 | 6/2006 | Brolin | |
| 2007/0206948 A1* | 9/2007 | Lee et al. | 398/71 |
| 2008/0138073 A1* | 6/2008 | Kim et al. | 398/79 |
| 2009/0116848 A1* | 5/2009 | Kim et al. | 398/140 |
| 2010/0142962 A1* | 6/2010 | Poustie et al. | 398/91 |

OTHER PUBLICATIONS

Biswanath Mukherjee, "WDM Optical Communication Networks: Progress and challenges," Oct. 1, 2000, IEEE Journal on Selected Areas in Communications, 18(10): 1816-1824.

Borella et al., "Optical Components for WDM Lightwave Networks," Aug. 1997, Proceedings of the IEEE, 85(8): 1272-1307.

Borella, Michael S. et al., "Optical Components for WDM Lightwave Networks," Proceedings of the IEEE, vol. 85, No. 8, Aug. 1997, 34 pages.

Mukherjee, Biswanath "WDM Optical Communication Networks: Progress and Challenges," IEEE Journal on Selected Areas in Communications, vol. 18, No. 10, Oct. 2000, 15 pages.

International Search Report received in International Application No. PCT/GB2009/051438, Applicant: The Centre for Integrated Photonics Limited, mailed Apr. 27, 2010, 8 pages.

Written Opinion of the International Searching Authority received in International Application No. PCT/GB2009/051438, Applicant: The Centre for Integrated Photonics Limited, mailed Apr. 27, 2010, 14 pages.

* cited by examiner

WAVELENGTH DIVISION MULTIPLEXING TRANSMISSION EQUIPMENT

FIELD OF INVENTION

This invention relates to telecommunication and computer networks. In particular the present invention is concerned with optical communication networks operating at data rates of 2.5 Gbit/s or greater.

RELATED ART

Optical communications from one location to another typically get transmitted over a number of different networks. Each type of network typically has different operating requirements and equipment depending on the distance the network has to transmit data, the number of different destinations that the network provides for and the budgetary constraints of running the network. The central part of a network is often called the core network. A core network is typically designed to be able to connect to and provide interconnection for a number of smaller 'access networks' and other smaller networks geographically located apart from each other by large distances, for example over 100 km, or 1000 km. A core network needs to be able to handle large amounts of data due to the amount of users that are dependent upon it. However, because the cost of operating a core network is shared amongst a wide number of people, the core network can normally afford to have larger numbers of high specification devices than smaller networks to ensure the reliability of the core network.

Conversely, access networks are smaller in reach and number of users and therefore network architectures and the devices used to implement access networks are typically chosen with cost in mind. Access networks are typically designed with a central office that, often together with one or more local offices, distributes and collects data from separate subscriber terminals in different locations. It is desirable in access networks to choose devices with operating specifications that are suitable for accomplishing the task they are assigned to do but which do not have performances that are over and above the performance which is required of them as such high performance devices are unnecessarily expensive and reduce the cost effectiveness of the network. As such, different optical networks have different devices and architectures to conform to the needs of the network.

WDM (Wavelength Division Multiplexing) is a well established technology to increase the capacity of optical fibre transmission systems. WDM systems have an array (multiplex) of different wavelengths (channels) that data may be transmitted upon. A coarse WDM (CWDM) system may provide just 8 wavelength channels spaced by 20 nm. DWDM (Dense Wavelength Division Multiplexing) systems have a denser channel spacing and can typically operate with 80 channels spaced by 50 GHz or 160 channels spaced by 25 GHz. For a DWDM system a critical issue is the ability to control the wavelength of the transmitter lasers so they remain within the wavelength grid specified by the international standards bodies.

In core networks using DWDM systems, it is usual for the transmission equipment used to generate, modulate and multiplex the DWDM signals to be separate from the equipment that originates and manipulates the electrical data. The former is often called the "line side" equipment and the latter the "client side" equipment. The "client side" equipment is usually connected to the "line side" equipment via an optical link. Unlike access networks where the subscriber terminals are housed in different locations, different sets of client side equipment in core networks are often located together, for example immediately next to each other in a rack. The client side equipment sends an optical signal over the optical link to the line side equipment at a single but arbitrary wavelength. The "line side" equipment that receives the optical signal from the "client side" equipment regenerates and re-modulates the signal onto a selected wavelength of the DWDM wavelength multiplex within equipment called a transponder. A transponder typically receives the optical signal, converts the signal to an electrical signal and re-transmits the signal using one of the wavelength channels of the WDM system. Each transponder has a laser which is accurately adjusted and set to operate at the required channel wavelength. It is known that the cost and additional complexity of having a transponder in the transmission system could be eliminated if the 'client side' equipment contained a tunable laser enabling any desired wavelength to be generated directly by the client equipment card, this scheme is disclosed in Cisco whitepaper "Converge IP and DWDM Layers in the Core Network" (www.cisco.comien/US/prod/collateral/routers/ps5763/prod_white_paper0900aecd80395e03.ht ml). However, a tunable laser still adds significantly to the cost of the client equipment and requires additional control and management systems to be associated with the client card. To provide the necessary control of the laser wavelength it is usually necessary to temperature control the laser which significantly increases the electrical power consumed by the client card.

Access networks often are often configured as WDM-PONs (Wavelength Division Multiplexed Passive Optical Networks). Such networks are usually intended for connecting a central office to a residential subscriber and as such have a different architecture to a core network and are designed to minimize the number of components and hence the cost of the network. Patent document EP1 503 531 A2 by Jung et-al. describes a WDM-PON system that has a multi-wavelength source located in a central office, and several subscriber terminals each with a reflective semiconductor optical amplifier (RSOA) that transmits an upward signal by a reflection of a multi-wavelength signal transmitted from the central office. EP1 503 531 A2 describes using a single waveguide grating router in a local office to distribute single wavelength channel data to and collect data from separate terminals each having a separate RSOA and broadcast reception optical receiver.

For these residential (access) applications, the data rate transmitted over the link between the remote location (subscriber) and the central office needs only to be relatively modest, typically 1.2 Gbit/s, and the maximum transmission distance of the network is typically less than 20 km. Each subscriber only receives a single wavelength channel. As such, the modulating devices used by the subscriber terminals in the access network, are typically RSOAs or injection locked semiconductor lasers, both of which provide optical gain. RSOAs are chosen because they provide both amplification and modulation to the signals going into and out of the subscriber terminal and obviate the need to have a separate external optical amplifier that adds cost to the access network architecture of the WDM-PON. RSOAs that are electrically modulated produce pulses with high degrees of chirp that are susceptible to high amounts of chromatic dispersion in optical fibres and are thus unsuitable for longer distance communications e.g. over 20 km, but provide good enough modulation and amplification for use in access networks. Modulating an RSOA at data rates faster than 1.2 Gbit/s introduces pulse degradations that further reduce the range that RSOA pulses can travel to less than 20 km.

For core networks there is an increasing need for higher capacity optical transmission as the core networks are required to interconnect increasing numbers smaller optical networks and there is an increasing demand for higher data rates. There is also a similar need to provide higher capacity links for interconnecting large data centres. To increase the capacity carried by a single optical fibre, it is common practice to use dense wavelength division multiplexing (DWDM). As the number of wavelength channels increases by using DWDM systems, the frequency spacing between the channels typically becomes smaller to 'fit in' the number of channels in the transmission band of the optical fibres. As the DWDM channel spacing gets closer, for example from 100 GHz to 50 GHz or 25 GHz, the DWDM transmission system requires precise control of individual laser wavelengths and achieving this is a significant contribution to the overall system cost. To cope with the increasing demand in capacity, core networks also require increasingly higher bit rates per wavelength channel.

The high specification devices needed for core optical networks require increasingly complex technology operating at faster speeds. Such devices are inherently expensive and require large amounts of electrical current to drive. The resulting heat generated by these devices and the fact that they are commonly located adjacently in compact equipment racks creates cooling problems as the performance of optoelectronic devices such as lasers and SOAs degrades with increasing temperature by processes such as auger re-combination. Cooling devices and systems are therefore commonly introduced into client card equipment racks which further add to expense and power consumption.

Current core optical networks are therefore both expensive to implement and run and suffer from cooling problems that degrade network performance

SUMMARY OF THE INVENTION

The present invention is as set out in the appended claims.

In this new invention, the economic benefits of eliminating the transponder are achieved but without the need for a tunable laser within the client side equipment. The present invention provides an alternative solution for long distance data transmission at high data rates (e.g. of 2.5 Gbit/s and above, typically 10 Gbit/s or greater).

The present invention provides an optical transmission network comprising a multi-wavelength source, a first wavelength selective routing element connected to the multi-wavelength source, client-side equipment for manipulating electrical signals comprising, an optical modulator connected to the first wavelength selective routing element; an optical receiver; and a second wavelength selective routing element connected to the optical receiver and operative to direct incoming signals from one or more remote locations to the optical receiver.

The optical transmission network of the present invention is preferably a core network.

In the proposed new scheme the laser previously used for transmitting data from the client equipment card to the line interface card is replaced by an optical modulator device. Continuous wave light from a shared multi-wavelength source is coupled to the modulator through a wavelength selective filter. The filter selects one wavelength from the many wavelengths generated by the multi-wavelength source. By choosing suitable filters each modulator can operate at a different wavelength. The outputs from all the modulators located on one or more client equipment cards can then be multiplexed together onto one or more fibres before optical amplification and onward transmission. The use of modulators rather than fixed wavelength lasers located on the client cards reduces the need for the network operator to hold a large inventory of different wavelength specific client cards and avoids the costs associated with the alternative of tunable lasers. For networks where it is necessary to reassign wavelengths to particular client cards during operation a modification to the proposed scheme is possible by the incorporation of an optical switch.

A preferred optical modulator for use in the present invention is one that is able to modulate optical pulses at bit rates greater than 2.5 gbit/s, preferably up to at least 10 Gbit/s, more preferably up to 40 Gbit/s, and provide output optical pulses with low or substantially no chirp that allows the pulses to propagate over at least 80 km, typically 100 km, without requiring any chromatic dispersion compensation.

The proposed scheme has economic advantages over existing methods because a multi-wavelength WDM source generating M different wavelengths can be built for much lower cost than a quantity of M tuneable lasers. Such multi-wavelength WDM sources may be an integrated multi-wavelength WDM source, such as an array of reflective semiconductor optical amplifiers hybrid integrated to a silica on silicon planar optical integrated circuit containing one or more array waveguide grating elements and associated connecting waveguides. Where a 'transmission system' comprises a line card and multiple client cards, further economic savings are possible because a single multi-wavelength laser could be shared over a plurality of transmission systems each carrying M wavelengths. In addition to the capital equipment cost saving, it is possible to achieve operational cost savings through the reduction of space and electrical power consumption. By use of a preferred design for the modulator within the client card, for example, where the modulator is reflective, the electrical power consumption can be significantly less than a transmitter using a tunable laser, especially for laser designs which require thermoelectric coolers.

LIST OF REFERENCES FOR THE FIGURES

Figure 1:
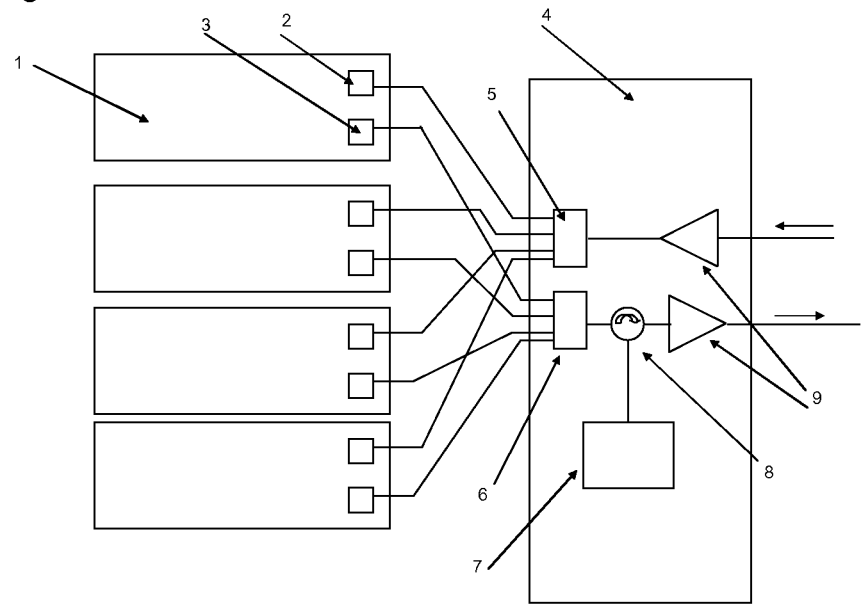
FIG. 1 shows an optical transmission system according to a first embodiment of the invention.
Figure 2:
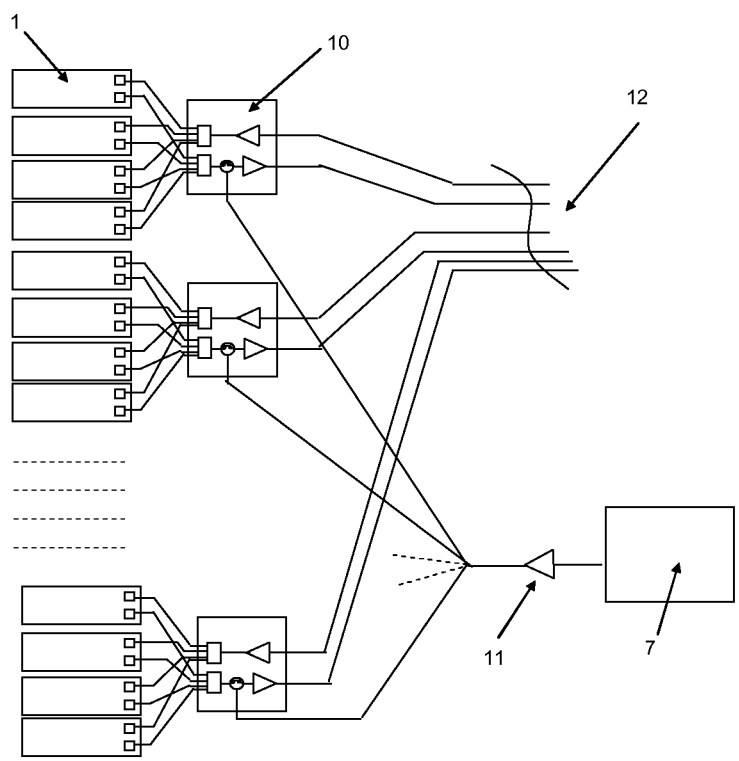
FIG. 2 shows an optical transmission system according to a second embodiment of the invention.
Figure 3:
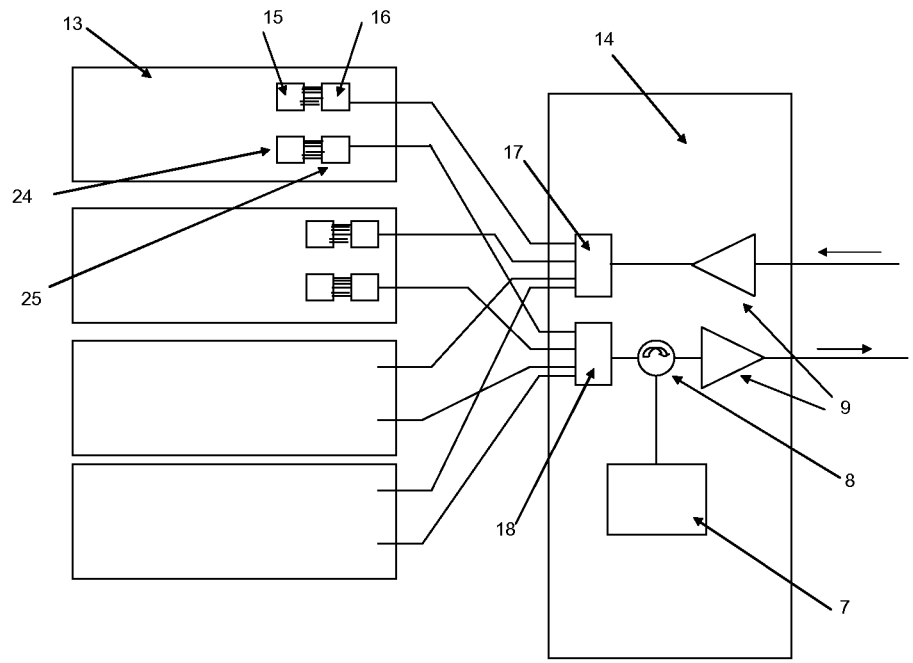
FIG. 3 shows an optical transmission system according to a third embodiment of the invention.
Figure 4:
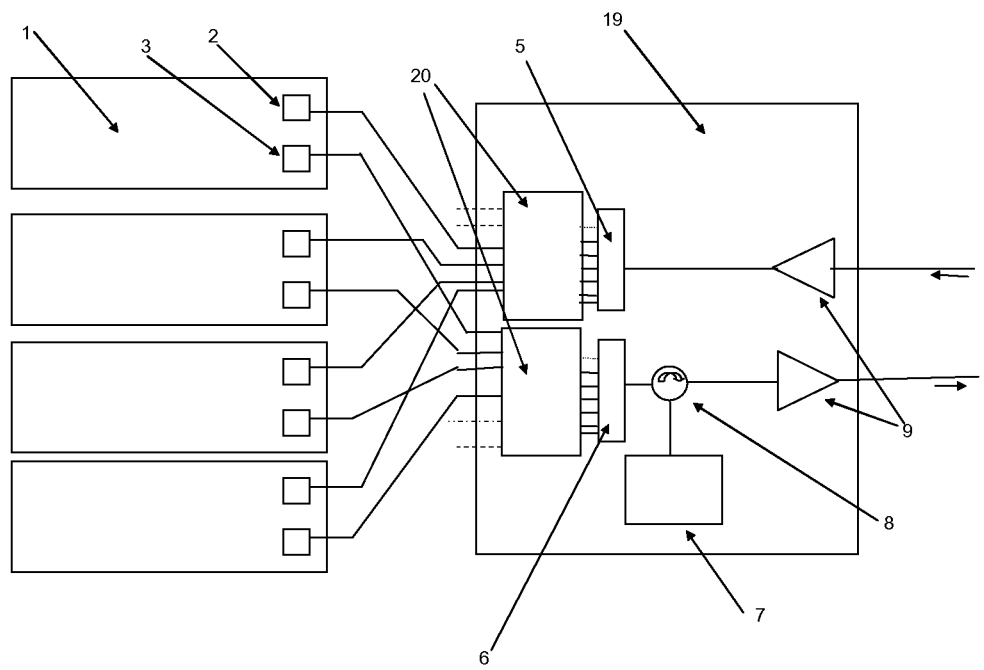
FIG. 4 shows an optical transmission system according to a fourth embodiment of the invention.
Figure 5:
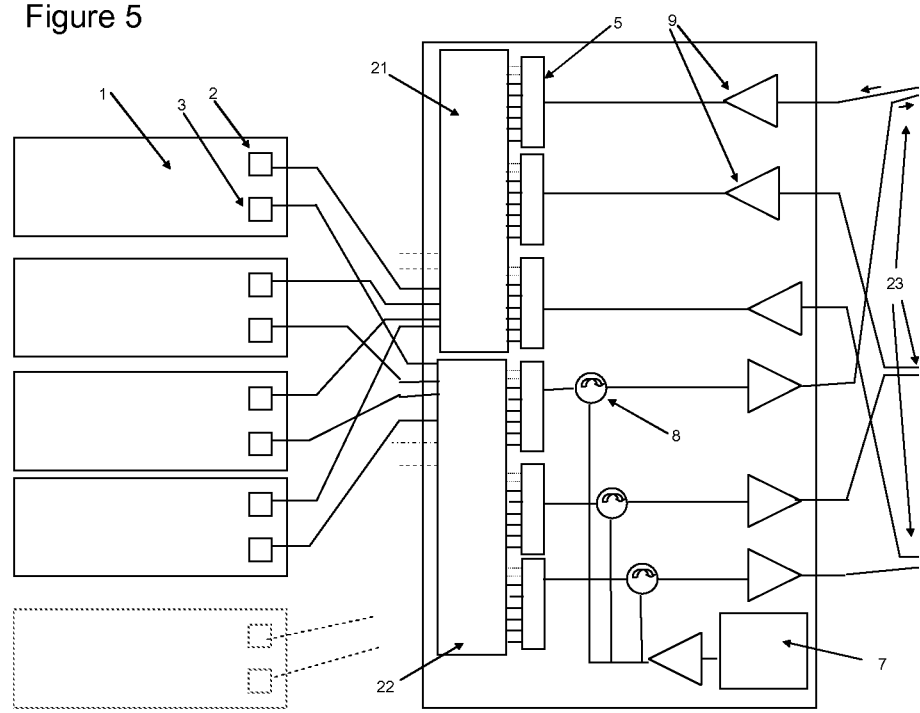
FIG. 5 shows an optical transmission system according to another embodiment of the invention which is an extension of the fourth embodiment.

FIG. 1
1 Client equipment card
2 Optical Receiver
3 Reflective modulator
4 Line equipment card
5 Array Waveguide grating (AWG) de-multiplexer
6 Array waveguide grating (AWG) multiplexer
7 Multi-wavelength source
8 Optical circulator
9 Optical amplifier
FIG. 2
1 Client equipment card
7 Multi-wavelength source 10 Line equipment card
11 Optical amplifier
FIG. 3
7 Multi-wavelength laser
8 Circulator
9 Optical amplifier
13 Client equipment card
14 Line equipment card
15 Array of optical receivers
16 Array waveguide grating (coarse demultiplexer)
17 De-interleaver (fine demultiplexer)
18 Interleaver (fine multiplexer)
24 Array of reflective modulators
25 Array waveguide grating demultiplexer (coarse)
FIG. 4
1 Client equipment card
2 Optical receiver
3 Reflective modulator
5 AWG demultiplexer
6 AWG multiplexer
7 Multiwavelength source
8 Circulator
9 Optical amplifier
18 Line equipment card
20 M×N Optical space switch (where M is number of input ports and N is number of output ports)
FIG. 5
1 Client equipment card
2 Optical receiver
3 Reflective modulator
5 Array waveguide grating device
7 Multi-wavelength source
8 Circulators
9 Optical amplifier
21 M×K Optical space switch (where M is number of input ports and K is number of output ports)
22 M×K Optical space switch
23 Multiple optical fibre transmission routes

DETAILED DESCRIPTION OF PREFERRED EMBODIMENTS

A first embodiment is illustrated in FIG. 1. Light from a centralised multi-wavelength source 7 producing M (typically 32) wavelengths is combined using a wavelength multiplexer to provide a single fibre output. The multi-wavelength source 7 is typically a hybrid integrated laser module containing M single wavelength lasers combined together using a planar array waveguide multiplexer. A suitable configuration for a multi-wavelength a source 7 with attractive features for this application is described in patent publication EP2082464 (A1) "Multi-wavelength Transmitter". The combined output from the multi-wavelength source 7 is connected via a circulator 8 to an AWG 6 which acts as both a wavelength multiplexer and de-multiplexer of light coming from and to optical modulators 3. Connections from the opposite side of the AWG 6 are connected to the optical modulators 3 located on individual client equipment cards 1. The modulators 3 would typically be reflective electro-absorption modulators as these have high bandwidth, typically (>5 GHz), low dynamic insertion loss (<5 dB), low drive voltage (<3V) and can produce short pulses that can propagate typically up to 80 km along a standard single mode optical fibre before chromatic dispersion of the pulses spreads and overlaps neighbouring pulses causing inter-symbol interference. The AWG design used within the multi-wavelength source 7 would typically have a Gaussian wavelength filter response providing good definition of the laser frequency whereas the AWG 6 used to multiplex and de-multiplex signals to and from the reflective modulators 3 would typically have a flattop filter response to avoid distorting the spectrum of the modulated signal. Within the line side equipment there is also a second AWG 5 which is used to de-multiplex the individual incoming signals from the transmission fibre into wavelength channels which are then connected to optical receivers 2 located on the client equipment cards 1. There may also be additional components within the line side equipment 4 including optical amplifiers 9 which are used to compensate for losses within the transmission path. Typically these amplifiers 9 would be erbium doped fibre amplifiers but other designs could also be used, including either semiconductor optical amplifiers or Raman amplifiers.

Alternatively the amplifiers may be located within/on the client card, for example being integrated with the optical modulator, for example an integrated semiconductor optical amplifier (SOA) and electro-absorption modulator (EAM). Such an integrated EAM-SOA may be monolithically integrated on a common substrate or may be hybrid integrated together onto a different substrate such as a silica on silicon substrate with silica waveguides interconnecting the SOA and EAM. The optical receiver on the client side card may also be monolithically or hybrid integrated with any of the optical modulator and optical amplifier.

A second embodiment of the present invention is shown in FIG. 2. In this arrangement a multi-wavelength source 7 is shared between several of the transmission systems which were described in the previous embodiment. Each of the transmission systems in this embodiment comprises a line card 10 and a plurality of client cards 1. The multiple wavelength source 7 is located externally of the line cards 10. To overcome the losses resulting from sharing the multi-wavelength source 7 with multiple line cards 10, an optical amplifier 11 is included in this scheme and is connected between the source 7 and the point where the optical connection from the source 7 splits to connect to the different line cards 10. Typically this amplifier 11 would be an erbium doped fibre amplifier but other designs could also be used, including either a semiconductor optical amplifier or Raman amplifier.

A third embodiment is shown in FIG. 3. In this arrangement multiple wavelengths are fed to each client equipment card 1. On each client equipment card a wavelength de-multiplexer 25 (third wavelength routing element), typically an AWG device, is used to separate individual wavelengths from a plurality of wavelengths generated by a multi-wavelength source 7. An array 24 consisting of a plurality of reflective modulators on the client card 13 is used to impose data generated by the client equipment onto a set of wavelengths. The output from the array 24 of reflective modulators is then recombined using the same AWG device 25. In the example shown in FIG. 3, each client card 13 produces 10 channels each channel spaced by an optical frequency of 200 GHz. The channels on each client card 13 are multiplexed using an AWG with a flat top profile. The outputs from several client cards are then further multiplexed using an inter-leaver 18 (first wavelength routing element) on a line side card 14. The third wavelength routing element has a coarser channel spacing than the first wavelength routing element. Sets of channels from adjacent client cards 13 are interleaved with a spacing of 50 GHz. In the example shown in FIG. 3 the inter-leaver 18 is used to multiplex the output of 4 client cards 13. Incoming signals from the transmission path also pass through two stages of de-multiplexing, with an inter-leaver 17 (second wavelength routing element) on the line side card 14 and an AWG 16 (fourth wavelength routing element) on the client card 13. An array of optical receivers 15 on each client card 13 is used to convert the incoming optical signals to electrical data. The fourth wavelength selective routing element has coarser channel spacing than the second wavelength selective routing element.

Coarser (larger channel spacing, for example 200 GHz) wavelength selective routing elements are typically cheaper to produce than wavelength selective routing elements with finer (narrower, for example 50 GHz) channel spacings. It is preferable, for low cost manufacture, to provide a set of standard low cost components that can be used for each client side card 13. By providing the client side cards 13 with coarser channel spaced wavelength selective routing elements than the line side card 14, each of the client cards 13 may have identical wavelength selective routing elements 16 and identical wavelength selective routing elements 25.

The wavelength selective routing elements 17, 18 on the line side card 14 are configured to direct to (and receive from) the client-side card a different wavelength channel within each of the coarser pass-bands of the wavelength selective routing elements 16, 25. For example, the wavelength selective routing element 18 on the line side card 14 may, within each pass-band of the client-side cards 13, route a different wavelength channel separated by 50 GHz to each different client-side card 13. Each client-side card 13 comprises a wavelength selective routing element 25 with a coarse pass-band of 200 GHz than can accept any one of the aforementioned four channels routed by the line side card 14.

Clearly, other combinations of channel spacing, number of channels and inter-leaving could be used depending on the requirements of individual client cards 13. For example, one of the proposed standards for 100 Gbit Ethernet transmission would require the optical interface to each client card 13 to consist of 4 wavelength channels each carrying 25 Gbit/s of data. For this application the optical channels from several 100 Gbit Ethernet client cards 13 could be interleaved before onward transmission.

A fourth embodiment is shown in FIG. 4. This embodiment provides a network architecture that allows for dynamic routing of wavelength channels between the line-side equipment 19 and the client side equipment 1. One or more incoming wavelength channels from the line side equipment 19, either generated by the multi-wavelength source 7 or coming from one or more remote locations, may be actively and selectively routed to a different client side card. In this network configuration, the wavelength channels going to the client side cards are reconfigurable rather than being fixed. Typically, the routing of the wavelength channels is determined and actuated by one or more optical or electrical signals.

In this arrangement an optical switch matrix 20 of M×N dimension is inserted between the AWG 6 connected to the Multi-wavelength laser and the reflective modulators 3 located on the individual client equipment cards 1. A similar switch matrix of M×N dimension is also connected between the AWG 5 used to de-multiplex incoming signals and the optical receivers 2 located on the client equipment cards 1. The optical switch matrix 20 allows any wavelength channel to be connected to any client card 1. The optical switch 20 may be designed to have either an identical number of input ports and output ports or a non-identical number of input ports and output ports. The latter may be required in some applications where the switch 20 is also used to provide additional traffic management functions such as concentration and protection switching.

The fourth embodiment described above may also be used to dynamically route a set of wavelengths to different client side cards as described in the third embodiment.

A further embodiment is shown in FIG. 5. In this extension of embodiment 4 the optical switch 21 of M×K dimension has connections to multiple transmission fibres. This allows any client equipment card 1 to transmit or receive on any of the available wavelengths and to any of many transmission fibres 23. Such a scheme would find applications where it is necessary to route data generated within the client equipment 1 to alternative destinations.

The modulators of the client side equipment 1 of all the previous embodiments are typically used for intensity modulation of the light from the multi-wavelength source 7. Client side equipment within the proposed network architectures of all the embodiments of the present invention may also comprise one or more modulators configured to provide other forms of modulation such as phase or vector modulation of the light from the multi-wavelength source 7. The use of phase and vector modulation formats can offer improved spectral efficiency and transmission performance compared to simple intensity modulation. The generation of PSK (Phase Shift Keying) or more complex vector modulation formats may be accomplished by using an array of two or more reflective electro-absorption modulators in the client-side card. For example, a client side card may generate a binary PSK signal by using a pair of reflective electro-absorption modulators. In this example, the outputs from two reflective electro-absorption modulators are coupled together using an optical splitter/coupler.

An array of reflective electro-absorption modulators has particular advantages in the proposed network architecture because of the compact size of the reflective electro-absorption modulators and low drive voltage required to operate them. These features are important when it is necessary to incorporate the modulator of the client side equipment within a compact package that is intended to fit on the client equipment cards. Such package formats are already specified within the SFP, SFP+ and XFP multisource agreements so it is highly desirable that any modulation configuration is able to fit within one of the established form factors.

More advanced modulation formats, such as QPSK (Quadrature Phase Shift Keying) can also be generated with similar configurations. For example, Dupuis et-al ("Hybrid optical vector modulator utilising AlGaInAs reflective EAMs and high index-contrast silica circuit" Electronics letters 2009, vol 45, no 4, pp 222-224) shows an array of reflective electro-absorption modulators in combination with a suitable interferometer that can be used to generate a QPSK signal. Clearly it is also possible to consider other methods to implement phase and vector modulation within a reflective transmitter and these could include the use of electro-optic effects in materials such as lithium niobate and polymers as well as semiconductor based materials.

The invention claimed is:
1. An optical transmission network comprising:
a provider-side equipment comprising a multi-wavelength source, a first wavelength selective routing element connected to the multi-wavelength source, and a second wavelength selective routing element; and
a client-side equipment for manipulating electrical signals comprising an optical modulator connected to the first wavelength selective routing element and an optical receiver, the optical modulator configured to receive the electrical signals from the optical receiver, wherein laser transmitters are excluded from the client-side equipment, wherein the second wavelength selective routing element is connected to the optical receiver and is configured to direct incoming optical signals to the optical receiver, and wherein the first wavelength selective routing element is connected to the optical modulator and is configured to provide a wavelength for modulating outgoing optical signals directly to the optical modulator, the wavelength for modulating outgoing optical signals being independent of wavelengths of the incoming optical signals.

2. The optical transmission network as claimed in claim 1, wherein the optical modulator comprises a reflective optical modulator.

3. The optical transmission network as claimed in claim 2, further comprising a plurality of client-side equipment, wherein each of the plurality of client-side equipment comprises a client side card, and wherein the first wavelength selective routing element is connected to the reflective optical modulator of each client side card by a single optical fiber to allow the first wavelength selective routing element to be used to distribute signals to each optical modulator and combine signals from each optical modulator.

4. The optical transmission network as defined in claim 2, wherein the reflective optical modulator comprises a reflective electro-absorption modulator.

5. The optical transmission network as claimed in claim 2, capable of operating at a data rate of at least 10Gbit/s.

6. The optical transmission network as defined in claim 1, wherein the optical modulator is an integrated combination of a semiconductor optical amplifier and a reflective electro-absorption modulator.

7. The optical transmission network as claimed in claim 1, wherein the optical modulator comprises a reflective Michelson modulator.

8. The optical transmission network as claimed in claim 1, wherein the modulator comprises a Mach-Zehnder modulator.

9. The optical transmission network as defined in claim 1, wherein the optical modulator comprises an optical phase modulator.

10. The optical transmission network as claimed in claim 1, further comprising an optical circulator for separating a continuous wave signal produced by the multi-wavelength source feeding into the first wavelength selective routing element from a modulated signal returning from the first wavelength selective routing element passed to the one or more remote locations.

11. The optical transmission network as claimed in claim 1, wherein the multi-wavelength source comprises an array of reflective semiconductor optical amplifiers coupled to an array waveguide grating device and sharing a common output mirror.

12. The optical transmission network as claimed in claim 1, wherein the multi-wavelength source comprises an integrated array of reflective semiconductor optical amplifiers hybrid-integrated with a silica on silicon planar optical integrated circuit containing one or more array waveguide grating elements and associated connecting waveguides.

13. The optical transmission network as claimed in claim 1, wherein the multi-wavelength source comprises one or more multi-wavelength lasers and wherein an output from the one or more multi-wavelength lasers is shared between modulators connected to several transmission paths.

14. The optical transmission network as claimed in claim 1, wherein each output from the first selective wavelength routing element is connected to a third wavelength routing element with a coarser channel spacing than the first wavelength selective routing element, the third wavelength routing element being connected to a set of reflective optical modulators located within the client-side equipment, wherein modulated signals from each set of reflective optical modulators are recombined in the third wavelength routing element before being recombined with signals from other sets of optical modulators within the first selective wavelength routing device before onward transmission to the one or more remote locations, and wherein incoming signals from the one or more remote locations are connected by an optical fiber to the second wavelength selective routing element which directs signals to a fourth wavelength selective routing element with a coarser channel spacing than the second wavelength selective routing element, the fourth wavelength selective routing element being located within the client-side equipment.

15. The optical transmission network as claimed in claim 1, wherein the first wavelength selective routing element or the second wavelength selective routing element comprises a planar integrated waveguide device, and wherein the integrated waveguide device is an array waveguide grating.

16. The optical transmission network as claimed in claim 1, wherein the first wavelength selective routing element or the second wavelength selective routing element comprises a thin film based optical device.

17. The optical transmission network as claimed in claim 1, further comprising an optical space switch used to provide a reconfigurable interconnection between outputs of the first wavelength selective routing element and optical connections made to the client-side equipment.

18. The optical transmission network as claimed in claim 1, further comprising an optical space switch providing a reconfigurable interconnection between a plurality of wavelength selective routing elements and optical connections made to the client side equipment, wherein each of the plurality of wavelength selective routing elements is connected to a separate fiber transmission path.

19. The optical transmission network as claimed in claim 1, wherein the first wavelength selective routing element is configured to provide the wavelength for modulating outgoing optical signals directly to the optical modulator of the client-side equipment by:

providing the wavelength for modulating outgoing optical signals to an intermediate optical element positioned in-between the first wavelength selective router and the optical modulator of the client-side equipment, the wavelength being relayed from the first wavelength selective router to the optical modulator of the client-side equipment without being processed by an active optical component.

20. A provider-side equipment comprising:
a multi-wavelength source;
a first wavelength selective routing element coupled to the multi-wavelength source; and
a second wavelength selective routing element configured to direct incoming optical signals to an optical receiver in a client-side equipment, wherein the client-side equipment excludes laser transmitters, wherein the first wavelength selective routing element is configured to provide a wavelength for modulating outgoing optical signals directly to an optical modulator of the client-side equipment, the wavelength for modulating outgoing optical signals being independent of wavelengths of the incoming optical signals, and wherein the first wavelength selective router provides the wavelength for modulating outgoing optical signals directly to the optical modulator of the client-side equipment by providing the wavelength for modulating outgoing optical signals to an intermediate optical element positioned in-between the first wavelength selective router and the optical modulator of the client-side equipment, the wavelength being relayed from the first wavelength selective router to the optical modulator of the client-side equipment without being processed by an active optical component.

\* \* \* \* \*